United States Patent
Rempe et al.

(10) Patent No.: US 11,986,774 B1
(45) Date of Patent: May 21, 2024

(54) ROBUST MEMBRANE SUPPORTING STRUCTURES

(71) Applicant: Memzyme, LLC, Albuquerque, NM (US)

(72) Inventors: Caroline Rempe, Albuquerque, NM (US); Ying-Bing Jiang, Woodland, CA (US); Yongqian Gao, Albuquerque, NM (US); Jimin Guo, Los Angeles, CA (US)

(73) Assignee: Memzyme, LLC, Albuquerque, NM (US)

( * ) Notice: Subject to any disclaimer, the term of this patent is extended or adjusted under 35 U.S.C. 154(b) by 105 days.

(21) Appl. No.: 17/697,230

(22) Filed: Mar. 17, 2022

Related U.S. Application Data

(60) Provisional application No. 63/161,992, filed on Mar. 17, 2021.

(51) Int. Cl.
*B01D 53/22* (2006.01)
*B01D 67/00* (2006.01)
*B01D 69/02* (2006.01)
*B01D 69/04* (2006.01)
*B01D 71/02* (2006.01)

(52) U.S. Cl.
CPC ....... *B01D 67/0048* (2013.01); *B01D 53/228* (2013.01); *B01D 69/02* (2013.01); *B01D 69/04* (2013.01); *B01D 71/02* (2013.01); *B01D 2053/223* (2013.01); *B01D 2323/286* (2013.01); *B01D 2325/06* (2013.01)

(58) Field of Classification Search
CPC ............... B01D 67/0048; B01D 69/04; B01D 2325/06; B01D 69/02; B01D 53/228; B01D 2053/223; B01D 2323/286; B01D 71/02

See application file for complete search history.

(56) References Cited

U.S. PATENT DOCUMENTS

| | | | |
|---|---|---|---|
| 7,396,382 B2 * | 7/2008 | Ku | B01D 71/024 96/11 |
| 9,242,210 B1 * | 1/2016 | Jiang | B01D 53/228 |
| 9,327,056 B2 * | 5/2016 | Bandyopadhyay | A61L 27/427 |
| 9,486,742 B1 * | 11/2016 | Rempe | B01D 63/066 |
| 9,844,762 B2 * | 12/2017 | Worsley | B01J 13/0091 |
| 2004/0028875 A1 * | 2/2004 | Van Rijn | B29C 67/02 264/299 |
| 2010/0178468 A1 * | 7/2010 | Jiang | B01D 67/0002 427/535 |
| 2012/0031833 A1 * | 2/2012 | Ho | B01D 71/70 210/488 |

(Continued)

*Primary Examiner* — Anthony R Shumate
(74) *Attorney, Agent, or Firm* — Scale LLP

(57) ABSTRACT

Disclosed are methods of preparing a porous ceramic support for an ultra-thin enzyme-assisted membrane, and a new membrane that can be used for gas filtration purposes to remove/separate carbon dioxide or other gases from a gas mixture such as those from power production or enhanced oil recovery or fuel production or air, and recycle/collect/utilize carbon dioxide. In some embodiments, a method may include blocking the pores of a porous substrate with a removable medium, and polishing the surface, coating a silica sol-gel solution onto the support, and removing the blocking medium and sol-gel surfactant to leave a well-confined porous structure.

10 Claims, 3 Drawing Sheets

(56) References Cited

U.S. PATENT DOCUMENTS

| | | | |
|---|---|---|---|
| 2013/0183489 A1* | 7/2013 | Cremer | B32B 5/00 |
| | | | 428/141 |
| 2017/0312702 A1* | 11/2017 | Shahsavari | G06F 1/3287 |
| 2017/0358399 A1* | 12/2017 | Matsuyama | H10K 85/00 |
| 2019/0128894 A1* | 5/2019 | Jain | C23C 16/403 |
| 2020/0047132 A1* | 2/2020 | Rempe | B01D 67/0037 |

* cited by examiner

ROBUST MEMBRANE SUPPORTING STRUCTURES

CROSS-REFERENCE TO RELATED APPLICATIONS

This application claims the benefit of U.S. Provisional Patent Application No. 63/161,992, filed Mar. 17, 2021, which is incorporated by reference herein in its entirety.

TECHNICAL FIELD

The present embodiments relate generally to the field of selectively permeable membranes and, more particularly, to robust and selectively permeable membranes that can use enzyme catalysis or another catalytic method to accelerate the selective permeation process.

BACKGROUND

Carbon dioxide is a valuable industrial commodity as well as a primary greenhouse gas. To meet the grand challenge of increasing supplies for industrial use and re-use while also reducing greenhouse gas emissions, different approaches have been developed or proposed to separate and capture $CO_2$. Membrane-related techniques are most promising due to their compactness, energy efficiency, and absence of toxic chemicals.

The search for a membrane used in gas separation applications that demonstrates both high selectivity and high flux has been conducted for decades. Current polymer membranes, such as those made from Hyflon® AD (Solvay), Teflon® AF (Du Pont), Cytop® (Asahi Glass), and others, have shown chemical resistance and stability, but lack the combination of high selectivity and high flux required for efficient separations. Also, such polymer-based materials are not as durable as inorganic membranes.

Another potential approach uses enzymes in liquid solutions to catalyze the conversion of $CO_2$ to water-soluble form to facilitate the uptake of $CO_2$ into the aqueous solution, and then catalyze the conversion of $CO_2$ into the gas phase and facilitate the release of $CO_2$. Neither enzymes alone in aqueous solution or polymer membranes with or without enzymes are feasible because of their high cost and lack of durability.

By combining a water droplet loaded with $CO_2$ enzymes in an ultrathin nanopore on an anodized alumina substrate, the present inventors have realized the first technology for cost-effective $CO_2$ capture. When compared with the nearest membrane competitor, this technology delivers a three times permeation rate, twenty times higher selectivity, and ten-times lower fabrication cost. However, the substrate is not suitable for scaling up for industrial operations.

What is needed is an improved membrane support to serve this purpose, and its method of formation and use. The present invention relates to a process for preparing porous ceramic membranes which are applicable as an apparatus for separating $CO_2$ from a gas or liquid.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In accordance with an embodiment, a new process for making an enzyme-catalyzed membrane support that is effective for $CO_2$ separation is disclosed.

In accordance with another embodiment, a membrane resulting from the disclosed process is disclosed In accordance with yet another embodiment, a method of use of the new membrane resulting from the disclosed process is disclosed.

In accordance with yet another embodiment, a method of using a robust membrane support is for separating $CO_2$ or another chemical from a gas or liquid such as those associated with power generation, fuel production, cement production, enhanced oil recovery, and air is disclosed.

Pores of the porous support can be filled with a second material that is softer than the porous support. The second material can be selectively removed by etching or oxidizing or dissolving without having the porous support being etched or oxidized or dissolved. The surface of the porous support that is filled with the second material can then be mechanically polished until any roughness of the polished surface is lower than 1 micron, or 500 nm, or 100 nm, or 50 nm. The surface can optionally be further polished using a polishing paste containing abrasives that are softer than the porous support but harder than the second material, so as to remove any residual second material on the top surface of the porous support. The surface can optionally then be cleaned using ozone or plasma to remove any residual second material on the top surface of the porous support, so as to ensure that the porous support will present a good adhesion with a subsequent coating of sol-gel solution as a thin layer on the top surface of the porous support. The sol-gel can comprise a surfactant, and the thickness of the layer can be less than 1 micron, or 500 nm, or 100 nm, or 50 nm, or 20 nm. Once the sol-gel solution becomes solidified, the surfactant can be selectively removed from the solidified sol-gel solution to generate nanopores, thereby forming a nanoporous layer on top of the porous support. The size of the nanopores can be determined by the molecular dimension of the surfactant. Before or after or at the same time of removing the surfactant, the second material can be removed from the porous support to recover the porous feature of the porous support, forming a structure with a thin nanoporous layer standing on the top of the porous support without having the nanoporous layer penetrating into the pores of the porous support.

Further variations are described in the detailed description of the invention below.

BRIEF DESCRIPTION OF THE DRAWINGS

The accompanying drawings, which are incorporated in and constitute a part of this specification, illustrate embodiments of the present teachings and, together with the description, explain the principles of the disclosure.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts. Below, the present invention will be described further by way of examples with reference to FIGS. 1-5 appended.

An embodiment of the present teachings includes a new process for making an enzyme-catalyzed membrane support that is effective for $CO_2$ separation, as well as the resulting membrane and its method of use.

Figure 1:
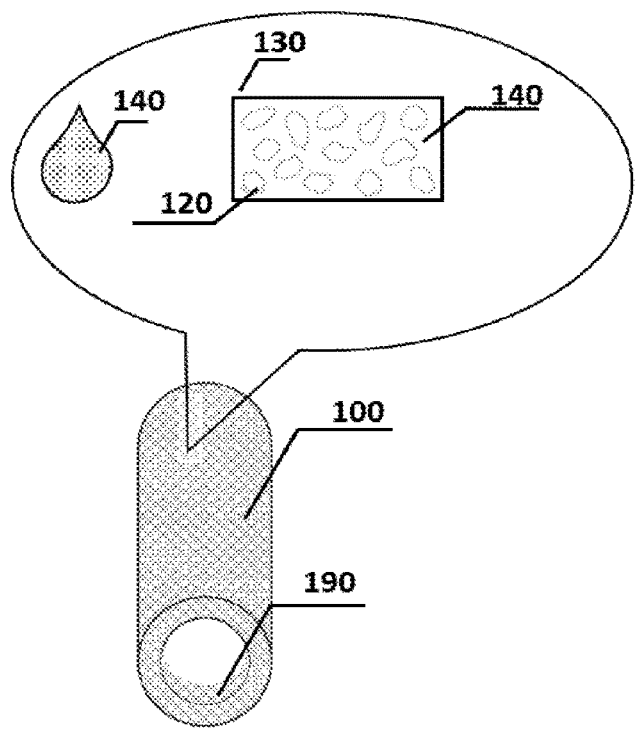
FIG. 1 illustrates a schematic illustration of a step for preparation of a porous ceramic substrate wherein a tubular substrate with sub-micron-sized porous structure can be soaked in a blocking medium material to seal the pores.

Referring to FIG. 1, a schematic illustration depicts a tubular porous membrane support, composed of the outer surface 100 and inner surface 190, according to an embodiment of the present teachings. The substrate may be flat or tubular, depending on the different application scenarios. Here, in this specific embodiment, a tubular ceramic substrate made from a material such as alumina ($\alpha$-$Al_2O_3$), with 0.5 in inner diameter and thickness 2 mm, can be employed. In some embodiments, the inner diameter of the cylinder may be between 0.1-5 cm, between 0.5-3 cm, between 1-2 cm, between 0.1-0.5 cm, or between 5-10 cm. In some embodiments, the thickness of the cylinder may be between 0.1-5 mm, between 0.5-3 mm, between 1-3 mm, between 0.1-1 mm, or between 1.5-2.5 mm. Other suitable materials may be used to form the support. In some embodiments, the support made be made, in whole or in part, from one or more of anodic aluminum oxide, aluminum oxide, anodic titanium oxide, titanium oxide, zirconium oxide, silicon carbide, or microporous glassy materials. The outer surface of the porous membrane support 100 can have a smaller pore diameter, which may be 20 nm to 200 nm, and the other end of the pores can be located on the inner side 190 with larger diameters, which can be from 1 µm to 100 µm. In viewing the micro-structure of the substrate, the material surrounding the pores 120 can be full of combined sintered alumina particles and the outer surface is not smooth and full of spikes or dents, 130/110. To make the porous membrane support, the pores may be blocked with a blocking medium material 140 to fill in the pre-existing pores. Here in a specific embodiment, the blocking material could be melted wax or a photoresist etc., as a medium to block the pores. In embodiments where hot wax is applied, the ceramic tube may preferably be precleaned by acid washing, then heated up slowly to about 400° C. in air. The wax may be heated (e.g., to approximately 400° C.) to maintain it at melting status. The tube substrate may then be soaked into hot wax solution for about 10-15 min. In some embodiments, the wax solution may fill into some or substantially all of the pores of the substrate. After the pores are filled with blocking medium 140, the substrate can then be taken out and cooled down to room temperature in air. As for another embodiment, the blocking material could be a type of photoresist solution and the tube can be soaked into the photoresist solution for long enough time (e.g., 10 min to 1 hour) to allow all pores to be filled completely. In some embodiments, this process may be performed at room temperature.

Figure 2:
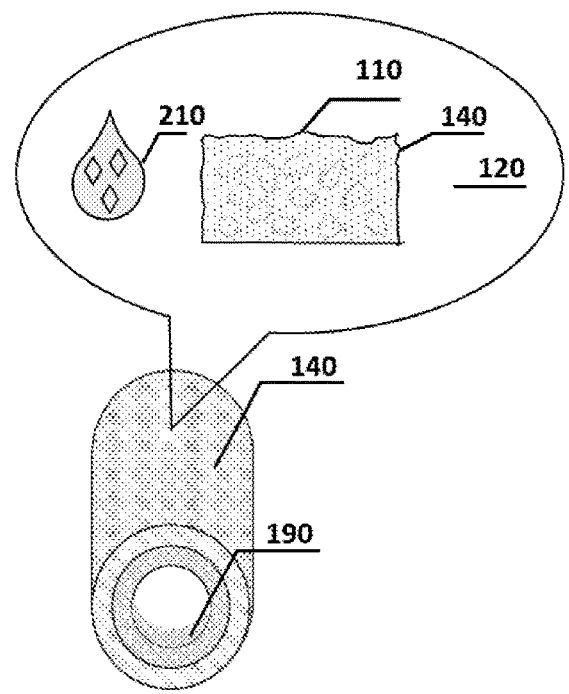
FIG. 2 illustrates a schematic illustration of a step for preparing the porous ceramic substrate wherein a polishing tool can be used to polish the surface to sub-micron smoothness.

Referring to FIG. 2, a schematic illustrates a polishing step to reduce the roughness 110 of the surface. In some embodiments, a polisher 210 may be applied to reduce the surface roughness down to sub-micron dimensions. In some embodiments, the polishing medium may be diamond paste, sandpaper, polishing pad, grinding tools, etc. In some embodiments, the polishing medium may be a paste containing abrasives that are softer than the porous support but harder than the second material. In an embodiment with a 0.5-micron diamond paste, a coarser grade may be used initially followed by a finer grade. The sample may be thoroughly cleaned and rinsed before applying a finer grade diamond paste. The diamond paste can be applied on a billiard type cloth and spread evenly. A lubricant or extender (mixture of glycol/alcohol/water/detergent) can be used to thin the paste. In some embodiments, the grade to start with may be adjusted depending on the conditions of the surface. For the microscale-finishing process, a grinding or lapping paper can be used prior to the polishing step. The finishing can start with 10 µm or 6 µm grinding grade paper and step down to 3 µm and 0.5 µm. For coarser surfaces, the finishing can start with 20-40 µm grinding grade paper and then gradually step down to sub 0.5 µm. After the polishing process, as shown in FIG. 2, the surface can be coated with a thin layer of blocking medium 140.

Figure 3:
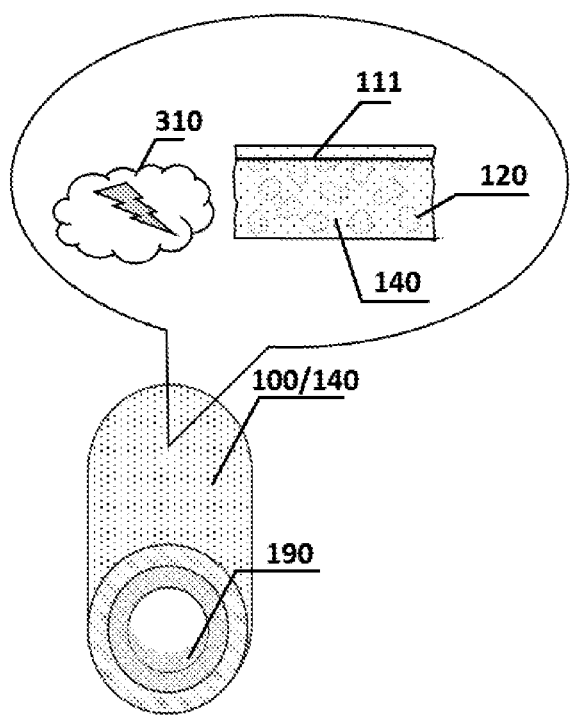
FIG. 3 illustrates a schematic illustration of a step for preparing the porous ceramic substrate wherein a cleaning procedure, which can be achieved with a plasma and UV light, can be applied to remove the residual blocking material on the surface.

As shown in FIG. 3, after the polishing process is done, the surface may be covered with a thin layer of blocking material 140. A cleaner 310 may be used to remove residual of the blocking material on the outer surface 100. For the cleaning process, the cleaner may preferably be softer than the base substrate 100, but hard/strong enough remove the thin blocking medium on the surface. In some embodiments, the cleaner may be physical or chemical. As an example, the cleaner 310 may be UV light etching, toothpaste, or plasma. In an embodiment, the polished tube with wax as blocking material can be soaked with UV light from a curing lamp for about 5-120 min, thereby burning away the surface layer of wax. As for another exemplary embodiment, the polished surface with a positive photoresist as blocking material may be treated with light to expose in vacuum for about 5-60 min to remove the photoresist.

Figure 4:
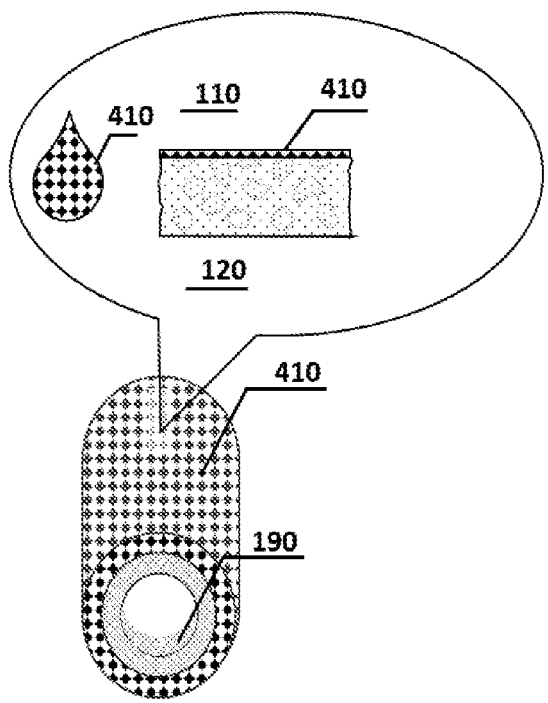
FIG. 4 illustrates a schematic illustration of a step for preparing the porous ceramic substrate wherein the cleaned surface can be coated with a silica sol-gel solution to form a self-assembled nano-porous structure on the surface.

After this step, the porous silica layer coating can be formed via EISA (evaporation-induced self-assembly) for the membrane fabrication, as illustrated in FIG. 4. A silica sol-gel solution 410 may be applied onto the surface of the substrate. In a specific embodiment, the sol-gel solution can be prepared where the self-assembling ink from hexadecyltrimethylammonium bromide (CTAB, 1.2 g) is dissolved in a mixture of ethanol (26.7 g) and aqueous HCl (0.05 M, 2.5 mL), then tetraethylorthosilicate (TEOS, 6.5 mL) is added into the solution under stirring. After 2 h of stirring, the sol precursor may be ready for use. The specific designed silica sol-gel solution may be the main material used with a self-assembly process to form porous channels. To make the sol-gel coating more uniformly coated onto the surface, in the specific embodiment, this self-assembly process may be dip-coating, or a roll-to-roll coating approach. The pore size of the silica coating layer may be controlled to be from 2 to 100 nm and the thickness of the porous silica layer varies from 20 to 50 nm. Depending on the surfactant type and sol-gel concentration, the self-assembled nanochannel structure features may be varied from well aligned vertical channels along the support pores to particle-like random channels accordingly.

Figure 5:
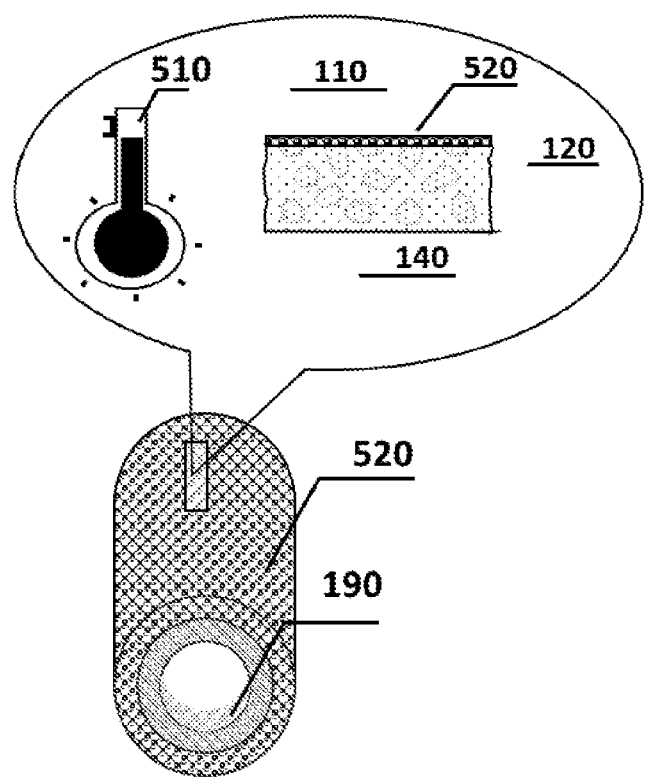
FIG. 5 illustrates a schematic illustration of a step for preparing the porous ceramic substrate wherein the surfactant and blocking material can be removed, which can be, for example by calcination overnight at 400° C.

After this step, the as-made substrate may be processed to remove blocking materials and form the porous channels onto the substate surface, as illustrated in FIG. 5. In this step, a tool 510 for removing the blocking materials could be a furnace, heated up to 400° C., and applied to remove the blocking materials and surfactant in the sol-gels to form porous channels onto the top surface of the substrate. After this step, the support can be made with features of multiple silica nanoparticle sintered nanochannels combined onto the porous substrate. The final top nano-porous layer can be about 1 micrometer thickness or less. As for another embodiment, the blocking material can be a photoresist and the removal process could be performed at lower temperature. NMP (1-methyl-2-pyrrolidone) is a generally suitable solvent for removing photoresist layers. The exceptionally low vapor pressure of NMP allows heating to 80° C. to remove even more cross-linked photoresist films. However, the nanopore channels are typically formed at high temperature to remove the surfactant in the sol-gel.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method of fabricating a porous support for use as $CO_2$ capturing membranes, comprising:
   providing a porous support;
   filling pores of the porous support with a second material, wherein the second material is softer than the porous support, and wherein the second material can be selectively removed from the porous support;
   polishing a surface of the porous support that is filled with the second material;
   coating a layer of sol-gel solution on the top surface of the porous support, wherein the sol-gel comprises surfactant, and the thickness of the layer is less than 1 micron;
   allowing the sol-gel solution to become solidified;
   removing the surfactant from the solidified sol-gel solution to generate nanopores, thereby forming a nanoporous layer on top of the porous support, wherein the size of the nanopores is determined by the molecular dimension of the surfactant; and
   before or after or at the same time of removing the surfactant, removing the second material from the porous support to recover a porous feature of the porous support, thereby forming a structure with a thin nanoporous layer standing on the top of the porous support without having the nanoporous layer penetrating into the pores of the porous support.

2. The method of claim 1, wherein the porous support is made of at least one of ceramic material, metallic material, or polymer material.

3. The method of claim 1, wherein the second material is at least one of a wax, a polymer, a metal, or a photoresist.

4. The method of claim 1, wherein the sol-gel solution further comprises at least one of silicon precursor, ethanol, and water.

5. The method of claim 1, wherein a solvent, ozone, UV, or high temperature oxidation (burning) is used to remove the surfactant.

6. The method of claim 1, wherein at least one of a solvent, ozone, UV, or high temperature oxidation (burning) is used to remove the second material from the porous support to recover the porous feature of the porous support.

7. The method of claim 1, wherein the porous support is cylindrical.

8. The method of claim 1, wherein polishing the surface of the porous support produces a polished surface having a roughness lower than 100 nm.

9. The method of claim 8, wherein polishing the surface of the porous support comprises:
   mechanically polishing the surface of the porous support;
   after mechanically polishing the surface of the porous support, further polishing the surface of the porous support using a paste comprising abrasives that are softer than the porous support but harder than the second material; and
   after applying the paste, cleaning the surface of the porous support.

10. The method of claim 9, wherein cleaning the surface of the porous support comprises applying at least one of ozone or plasma to the surface of the porous support.

* * * * *